Oct. 8, 1940.  T. W. SUKUMLYN  2,216,965
LENS STRUCTURE
Filed April 2, 1938

INVENTOR
Thomas W. Sukumlyn
BY John Flam
ATTORNEY

Patented Oct. 8, 1940

2,216,965

UNITED STATES PATENT OFFICE 2,216,965

LENS STRUCTURE

Thomas W. Sukumlyn, Los Angeles, Calif.

Application April 2, 1938, Serial No. 199,668

1 Claim. (Cl. 88—57)

This invention relates to optical lenses. More particularly, it relates to a lens structure in which longitudinal spherical aberration is greatly reduced in a simple and inexpensive manner.

Lenses having large openings in relation to their focal lengths are especially subject to the type of aberration mentioned. For example, we may assume that parallel rays are passed through a lens, the axis of the lens being also parallel to the rays. A perfect lens would so refract all of the parallel rays that the directions of all of them converge at a common point or focus on the lens axis. And this must be true for rays that are near the lens axis, as well as for rays that are near the rim of the lens. In actual practice, however, lenses defined by spherical surfaces do not refract the rays so that they converge at a common point. The distance, measured along the lens axis, between the points where the rim ray intersects the axis, and a paraxial ray intersects the axis, is a measure of the longitudinal spherical aberration, for these two zones of the lens.

It is one of the objects of this invention to make it possible to correct this lens fault in a simple and convenient manner.

It is another object of my invention to provide a lens structure made up of layers or laminations attached together and so proportioned and of such material as to provide the necessary refractive powers for causing a much closer convergence of all of these parallel rays.

This invention possesses many other advantages, and has other objects which may be made more easily apparent from a consideration of several embodiments of the invention. For this purpose there are shown a few forms in the drawing accompanying and forming part of the present specification. These forms will now be described in detail, illustrating the general principles of the invention; but it is to be understood that this detailed description is not to be taken in a limiting sense, since the scope of the invention is best defined by the appended claim.

Referring to the drawing.

Figure 1:
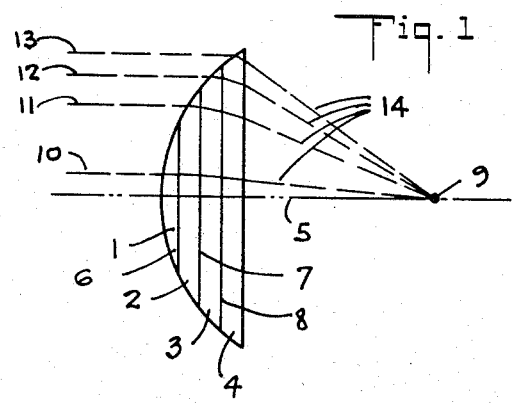
Figure 1 is a diagrammatic view of one form of lens structure embodying the invention and illustrating the refraction of rays therethrough.

In Figure 1 the lens structure is illustrated as having a series of spherical segments 1, 2, 3 and 4. In this form of the invention these segments are symmetrically disposed about a common axis 5, which also forms the lens axis. These layers 1, 2, 3 and 4 may be appropriately cemented together along the planar contacting surfaces, 6, 7 and 8. These planar faces are shown as normal to the lens axis 5.

The segments or layers 1, 2, 3 and 4 are made of such glass as to effect an improvement in the longitudinal aberrations common in lenses of this type. For example, if it be assumed that a beam of light from a distance is incident upon the convex side of the lens structure so as to form a bundle of rays parallel to the axis 5, a perfect lens structure should converge the entire beam to a single point 9 on the axis 5. While perfection is not herein attained, yet substantial correction is assured, the rays in fact all converging within very narrow limits on axis 5.

Thus for example, the elemental ray 10 adjacent the axis 5 (hereinafter called a paraxial ray) is refracted in succession through all four of the laminations or layers 1, 2, 3, 4 to intersect the axis 5 at the point 9. For rays such as 11, 12 and 13 approaching the rim of the lens structure, the number of layers through which the elemental rays are refracted becomes less and less; and for the rim ray 13 but one layer 4 is encountered. By appropriate choice of refracting glass for these layers 1, 2, 3 and 4, it is possible to insure that all of the refracted rays 14 converge upon substantially a single point 9. This result is accomplished in spite of the fact that the convex surface defined by layers 1, 2, 3 and 4 is a true spherical surface. It is a simple matter, having in mind the refractive indices of the available materials, so to design and choose the thickness and the material of the component lens layers as to cause substantially perfect convergence of all of the four rays 10, 11, 12 and 13 which fall successively farther and farther away from the axis 5. For rays intermediate these positions, the divergence from point 9 is comparatively minor.

The layers 1, 2, 3 and 4 may be cemented together in any appropriate manner to form, as indicated in this modification, a plano convex lens. However, the invention is not limited to this form.

There has been considered thus far only the refraction of monochromatic light. If it is desired that polychromatic or panchromatic light be refracted through a lens structure with reduced longitudinal spherical aberrations, a form of structure illustrated in Fig. 2 may be used. In this form there is a composite or compound lens having a convex surface on one side, and a concave surface on the other side. The convex surface is formed by the aid of the layers 15, 16, 17, 18 and 19 designed in substantially the same manner as disclosed in connection with Fig. 1. The layers 20, 21, 22 and 23, however, define a concave lens surface having negative refractive qualities. By appropriate choice of the glass making up these layers, the longitudinal spherical aberrations of rays having more than one color can be readily reduced.

Figure 3:
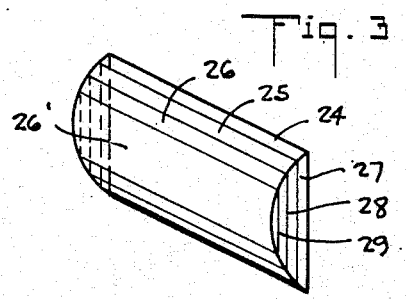
Fig. 3 is a pictorial view of a cylindrical lens structure embodying the invention.

Fig. 3 illustrates a cylindrical lens structure in which the layers 24, 25, 26 and 26' form a convex surface with the planes of separation 27, 28 and 29, generally normal to a plane passing through the axis of the lens structure. In this form of the invention a beam of parallel rays converges substantially at a common line within the axial plane. The longitudinal aberration is reduced, as in the form illustrated in Fig. 1.

Figure 2:
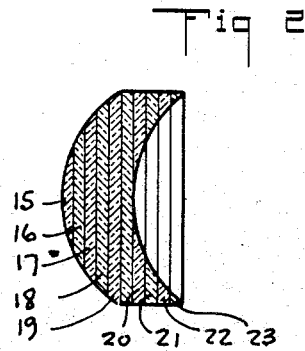
Fig. 2 is a sectional view of a modified form of lens structure incorporating the invention.
Figure 4:
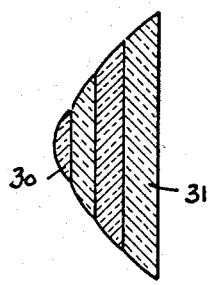
Fig. 4 is a sectional view of a lens structure adapted to perform the same function as that shown in Fig. 1, having a modified structure.

Instead of providing uniform curvatures, as illustrated in Figs. 1, 2 and 3 for the individual rays, it is possible to provide uniform material for the layers but with different curvatures; or to provide material of different indices of refraction and different curvature. Such a lens is shown in cross section in Fig. 4. Here the curvature of the top layer 30 of the convex lens structure is shown as a maximum, the curvature decreasing for the lowermost layer 31 of the lens structure. By appropriate choice of curvatures, the resultant refracted rays between the lens axis and the rim of the lens converge substantially upon a common point.

Figure 5:
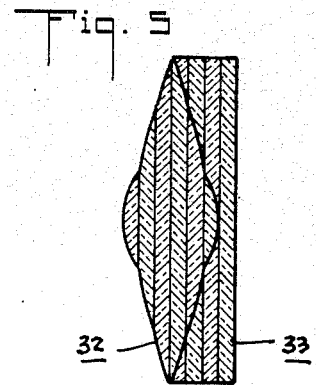
Fig. 5 is a sectional view of a compound lens structure incorporating the invention.

In Fig. 5 there is shown another form of the invention utilizing a compound lens structure. In this case there is the equivalent of a doublet lens, one lens structure 32 being of the convex or lenticular form, and the other lens structure 33 being of concave form. The layers, as in those previously illustrated, may be appropriately cemented together. Thus the two lens structures 32 and 33, having oppositely dispersive qualities, can be utilized to achromatize the refracted rays.

By the aid of this invention it is apparent that merely spherical and flat surfaces need be used, and yet the advantages of minimizing spherical aberrations are obtained.

What is claimed is:

In a multi-layer lens structure having a lens axis, a plurality of layers transverse to the axis and having contiguous transversely curved surfaces as well as plane surfaces, said layers being disposed symmetrically with respect to the axis and having different indices of refraction, said indices of refraction being so chosen with regard to the thickness and degree of curvature of the respective layers, as well as to the indices of refraction and thickness of the adjacent layers as to reduce the longitudinal spherical aberration of a beam incident on the lens, one series of layers having convex surfaces, the other series of layers having concave surfaces.

THOMAS W. SUKUMLYN.